United States Patent Office 3,382,173
Patented May 7, 1968

3,382,173
HIGH-PRESSURE LUBRICANT
Hermann Zorn and Erwin Steininger, both c/o Technochemie G.m.b.H., Heiligenbergstr., 1b, Heidelberg, Germany
No Drawing. Continuation-in-part of application Ser. No. 148,014, Oct. 23, 1961. This application June 15, 1964, Ser. No. 375,977
Claims priority, application Germany, Dec. 23, 1960, T 19,459
5 Claims. (Cl. 252—49.8)

This invention relates to high pressure lubricants, and more particularly to organic phosphorus compounds which are useful lubricants even under conditions of high temperature and high pressure, and which improve the performance of conventional lubricants when admixed thereto in relatively minor amounts.

This application is a continuation-in-part of our co-pending application Ser. No. 148,014, filed on Oct. 23, 1961, now abandoned, in which we disclosed methods for producing certain biphosphines of the formula

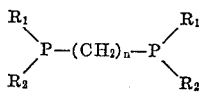

wherein $R_1$ and $R_2$ may be aryl, alkyl, or aralkyl radicals, $R_1$ moreover may be hydrogen, and $n$ is an integer not smaller than 6, and preferably ten or greater. If the carbon chain connecting the phosphorus atoms is branched, it should have a straight length of at least six carbon atoms.

The bis-phosphines of the invention are more or less viscous liquids whose viscosity changes relatively little with temperature, and which resist heating to elevated temperature for extended periods. The thermal stability of the bi-phosphines of the invention increase with increasing length of the carbon chain connecting the phosphorus atoms, and the thermal changes in viscosity also decrease with increasing carbon chain length.

The viscosity change at high temperatures is further reduced if at least one of R and R' is an alkyl radical having a long carbon chain, and even better results are obtained when substituted aromatic radicals constitute R or R'. Alkyl substituted aromatic radicals particularly enhance the valuable lubricant properties of the bi-phosphines.

The thermal resistance of the bi-phosphines of the invention also makes them suitable as hydraulic fluids under severe conditions of use. Those bi-phosphines of the invention which have aromatic radicals attached to the phosphorus atoms have mild reducing properties, and thus protect other ingredients of a lubricant composition against oxidation.

Several methods are available for synthesizing the bi-phosphines of the invention. According to a preferred method, two molecules of a secondary phosphine are condensed with a dihalogenated hydrocarbon molecule. Primary or secondary, bis-primary or bis-secondary phosphines are reacted to replace all free hydrogen atoms on the phosphorus atom by alkali metal. Lithium is the preferred alkali metal, and butyllithium the preferred reagent for introducing the lithium atom. The alkali metal phosphine compound may then be further reacted with alkyl mono- or dihalides. The phosphine starting material may also be brominated to the corresponding monobromophosphine which may be further reacted with Grignard's reagent or with other organometallic compounds.

The manner in which the biphosphines of the invention may be prepared is further illustrated by the following examples, and those skilled in the art will readily apply these teachings to homologous and analogous bi-phosphines of the invention.

EXAMPLE 1

A mixture of 387 parts by volume dodecyl butyl phosphine ($C_{12}H_{25}$-PH-$C_4H_9$) with 400 parts of tetrahydrofurane was prepared under a nitrogen atmosphere in a flask equipped with a reflux condenser. While the contents of the flasks were kept at a temperature between 20 and 50 degrees centigrade, a 3.5 molar solution of butyllithium in hexane was added to the phosphine solution drop by drop until the added butyl lithium amounted to 390 parts by volume.

When these reactants had been combined, the solution was refluxed for three hours, and 161 parts 1.8-dibromo-octane were then added drop by drop. Water was thereafter added to the reaction mixture until it separated into two layers. The non-aqueous phase was dried by means of anhydrous sodium sulfate. The solvents were evaporated, and the excess of unreacted phosphine was distilled off by heating at a pressure of 0.1 mm. Hg to 220° C.

318 parts octamethylene - bis-dodecyl-butyl-phosphine were obtained. The product has a boiling point of 230° C. at 0.001 mm. Hg, and may be purified by distillation. The refractive index $n_D^{20}$ is 1.4843, the specific gravity at 20°=0.8670.

EXAMPLE 2

A solution of 208 parts tolylhexylphosphine in 1500 parts anhydrous ethyl ether was refluxed for 12 hours with 23 parts sodium wire in a nitrogen atmosphere. When the sodium has been completely consumed, a solution of 191 parts dibromononadecane in 250 parts ether was added. The reaction mixture was refluxed for one hour, and worked up by addition of water and fractionation of the organic solvent phase in the manner described in Example 1.

262 parts nonadecylene-bis-tolylhexylphosphine were obtained, and may be purified by vacuum distillation. $n_D^{20}=1.5181$, sp. gr.$_{20}=0.1930$.

EXAMPLE 3

35.2 parts potassium were dispersed in 200 parts octane in a flask equipped with a reflux condenser in a nitrogen atmosphere. A solution of 185 parts diphenyl phosphine in 500 parts octane was added drop by drop, while the temperature of the resulting mixture was held between 60 and 80° C. The completed mixture was heated for another hour to 80–100° C., and then cooled to a temperature between 60 and 80° C. At that temperature, a solution of 135 parts dichlorononadecane in 200 parts octane was added. The reaction was completed by refluxing for two hours, and the reaction mixture was decomposed by addition of 300 parts water, drying of the organic solvent phase, and distillation in the manner described in Example 1.

142 parts nonadecylene-bis-diphenylphosphine were obtained as a highest boiling residue. $n_D^{20}=1.5794$, sp. gr.$_{20}=0.9748$.

EXAMPLE 4

20.2 parts sodium wire were immersed in 200 parts ether in a nitrogen atmosphere. A solution of 108 parts primary tolyl phosphine in 150 parts dry ethyl ether was added, and the mixture was refluxed for two hours. 128 parts dibromononadecane were gradually added thereafter, and the reaction mixture so obtained was refluxed for two hours.

200 parts of water were added, and the organic solvent phase was worked up as described in Example 1. 132 parts non - adecylene-bis-monotolylphosphine were obtained. $n_D^{20}=1.5368$, sp. gr.$_{20}=0.9491$.

EXAMPLE 5

19.5 parts potassium were suspended in 300 parts hexane, and 124 parts decamethylene-bis-phosphine were added while the mixture was being kept at a temperature between 60 and 70° C. The mixture was refluxed for one hour, and 83 parts 1-bromohexane dissolved in 100 parts hexane were added.

The reaction mixture was further processed as described in the preceding examples, and 120 parts decamethylene-bis-monohexylphosphine were obtained. The compound boils between 140 and 150° C. at 0.05 mm. Hg $n_D^{20}=1.4631$, sp. gr.$_{20}=0.8283$.

EXAMPLE 6

The procedure of Example 1 was repeated using a solution of 102 parts nonadecylene-bis-monotolylphosphine in dry tetrahydrofurane, butyllithium, and 66 parts 1-bromohexane as the reactant. 91 parts nonadecylene-bis-tolylhexylphosphine were obtained. $n_D^{20}=1.5181$, sp. gr.$_{20}=0.9130$.

The lubricating properties of representative biphosphines of the invention and of chemically related compounds are shown in the following tables. In these tables, the substances tested are identified by code letters as follows:

A. Bis-butyl-dodecyl-phosphine
B. Butylene-bis-butyl-dodecyl phosphine
C. Hexylene-bis-butyl-dodecyl-phosphine
D. Octylene-bis-butyl-dodecyl-phosphine
E. Decylene-bis-butyl-dodecyl phosphine
F. Nonadecylene-bis-butyl-dodecyl phosphine
G. Decylene-bis-phenyl-hexyl phosphine
H. Decylene-bis-tolyl-hexyl-phosphine
I. Nonadecylene-bis-tolyl-hexyl-phosphine
J. Nonadecylene-bis-tolyl-isobutyl-phosphine The viscosity of each substance in centistokes at 100° F. was determined initially, after six hours heating at 280° C. in a nitrogen atmosphere, after further heat treatment in a nitrogen atmosphere at 290° C., and so forth, until cumulative heat treatment was discontinued because of major changes, or until at last heat treatment had been applied at 350° C.

TABLE 1

| Last Heat Treatment at °C | Viscosity, Centistokes at 100° F | | | | | | | | | |
|---|---|---|---|---|---|---|---|---|---|---|
| | A | B | C | D | E | F | G | H | I | J |
| 280 | 32.54 | 23.76 | 19.96 | 68.69 | 50.68 | 44.96 | 62.3 | 89.6 | 110.40 | 115.21 |
| 290 | 42.00 | 26.81 | 19.26 | 79.85 | 54.14 | 48.62 | 62.25 | 91.65 | 107.58 | 114.9 |
| 300 | 46.07 | 30.37 | 20.61 | 100.3 | 63.44 | 53.14 | 62.4 | 94.9 | 108.19 | 116.2 |
| 310 | 58.30 | 37.38 | 27.63 | 152.2 | 85.04 | 66.34 | 63.74 | 97.3 | 112.19 | 121.22 |
| 320 | 85.98 | 51.59 | 38.46 | 285.8 | 106.9 | 89.78 | 62.7 | 99.9 | 93.55 | 107.55 |
| 330 | 247.5 | 91.28 | (¹) | 722.5 | 180.3 | 125.9 | 43.64 | 102.18 | 54.95 | 97.16 |
| 340 | (²) | (¹) | | (²) | 396.3 | 194.6 | (³) | 70.23 | 21.92 | 49.74 |
| 350 | | | | | (²) | (²) | | (³) | (³) | 31.76 |
| | | | | | | | | | | 27.89 |

¹ Crystalline precipitate.
² Highly viscous, but transparent.
³ Viscosity not measurable, solid precipitate.
NOTE.—The viscosity values after heat treatment tabulated in Table 1 are again listed in Table 2 as percentage changes in the original viscosity.

TABLE 2

| Last Heat Treatment, °C | Viscosity Change, Percent | | | | | | | | | |
|---|---|---|---|---|---|---|---|---|---|---|
| | A | B | C | D | E | F | G | H | I | J |
| 280 | +28.1 | +12.8 | −3.5 | +16.2 | +.68 | +8.1 | −0.04 | +2.2 | −2.56 | −0.26 |
| 290 | +41.6 | +27.8 | +3.3 | +46.1 | +25.7 | +18.2 | +0.2 | +5.8 | −1.94 | +0.87 |
| 300 | +79.1 | +57.3 | +38.4 | +121.5 | +67.8 | +47.6 | ±2.3 | +8.5 | −1.5 | +5.2 |
| 310 | +164 | +117 | +92.6 | +316 | +111 | +100 | +0.7 | +11.5 | +15.2 | −6.6 |
| 320 | +568 | ±284 | | +950 | +261 | +180 | −30.0 | +14.0 | −50.0 | −15.6 |
| 330 | | | | | +682 | +333 | | +26.8 | −80.0 | −56.8 |
| 340 | | | | | | | | | | −72.5 |
| 350 | | | | | | | | | | −93.3 |

EXAMPLE 7

A solution was prepared from 100 parts nonadecylene-bis-monohexylphosphine and 200 parts chloroform. While a temperature between 0 and 10° C. was maintained, a mixture of 64 parts bromine and 150 parts chloroform was added. The solvent was distilled off. The brominated product was dissolved in 200 parts ether, and the solution was added drop by drop to a solution of 0.4 equivalents phenylmagnesium bromide in 200 parts ethyl ether. The mixture was refluxed for one hour. Upon addition of 200 parts saturated aqueous ammonium chloride solution, an organic solvent phase was formed. It was dried, and the solvent was evaporated. 63 parts nonadecylene - bis-phenylhexylphosphine were obtained. The product boils at 250° C. under a pressure of 0.001 mm. Hg $n_D^{20}=1.5225$, sp. gr.$_{20}=0.9270$.

EXAMPLE 8

100 parts nonadecylene-bis-monohexylphosphine were brominated as in Example 7, and the bromination product was reacted with butyllithium. The reaction product was treated with water and worked up as described in the preceding examples. 53 parts nonadecylene-bis-hexylbutylphosphine were obtained. $n_D^{20}=1.4852$, sp. gr.$_{20}=0.8678$.

It is evident from Tables 1 and 2 that compounds G to J which have aromatic nuclei directly attached to phosphorus atoms separated by long alkylene chains are superior to compounds A to F in their high temperature stability. The appearance of compounds G to J was further graded qualitatively after the several successive heat treatments. The following evaluation code applies to Table 3:

1 Colorless
2 Yellowish
3 Yellow
4 Light brown
5 Dark brown (a) Clear
(b) Slight precipitate
(c) Precipitate

TABLE 3

| Last Heat Treatment, °C | Compound | | | |
|---|---|---|---|---|
| | G | H | I | J |
| 280 | 1 (a) | 1 (a) | 1 (a) | 1 (a) |
| 290 | 2 (a) | 2 (a) | 1 (a) | 1 (a) |
| 300 | 2 (a) | 1 (a) | 1 (a) | 1 (a) |
| 310 | 2 (a) | 1 (b) | 2 (a) | 2 (a) |
| 320 | 4 (a) | 2 (b) | 4 (a) | 3 (a) |
| 330 | 5 (c) | 3 | 5 (a) | 3 (b) |
| 340 | | (c) | (c) | 4 (a) |
| 350 | | | | 5 (b) |

The difference in viscosity at different temperatures can be controlled in the bisphosphines of the invention by the selection of suitable radicals R and R' as will be evident from the following Table. Aliphatic radicals having a long, straight chain improve the viscosity index and reduce the pour point.

TABLE 4

| Compound | 20° C. | 100° F. | 50° C. | 210° F. | V.I. | V.P. | m | Pour Point, ° C. |
|---|---|---|---|---|---|---|---|---|
| A | 97.45 | 40.01 | 24.23 | 5.87 | 95 | 1.89 | 3.74 | −56 |
| B | 123.14 | 48.41 | 29.08 | 6.72 | 100 | 1.84 | 3.65 | −55 |
| C | 144.5 | 56.26 | 33.70 | 7.73 | 109 | 1.71 | 3.53 | −54 |
| D | 182.0 | 66.50 | 39.24 | 8.87 | 112 | 1.72 | 3.50 | −53 |
| E | 165.5 | 63.81 | 38.10 | 8.44 | 113 | 1.68 | 3.48 | −52 |
| F | 193.6 | 76.8 | 47.04 | 10.62 | 125 | 1.46 | 3.24 | −40 |
| G | 157.5 | 62.28 | 34.89 | 8.09 | 105 | 1.72 | 3.52 | −45 |
| H | 258.5 | 89.6 | 49.5 | 9.8 | 95 | 1.95 | 3.59 | −41 |
| I | 250.1 | 91.14 | 51.45 | 10.63 | 108 | 1.72 | 3.43 | −47 |
| J | 361.9 | 115.2 | 64.09 | 11.08 | 87 | 2.09 | 3.63 | −33 |

The biphospines of the invention are useful lubricants, when used singly or in mixtures with each other, but they are particularly useful additives for conventional lubricating oils. They significantly improve the resistance of the lubricating film to high contact pressure and reduce the tendency to sludge formation. The following examples illustrate typical improvements obtained in conventional lubricating oils by admixture of a bi-phosphine of the invention.

EXAMPLE 9

95 parts of a commercial automotive lubricating oil of viscosity SAE 20 and mainly consisting of petroleum hydrocarbons were mixed with 5 parts nonadecylene-bis-tolyl-isobutyl-phosphine. A clear solution was obtained.

Samples of the mixture and of the unmixed commercial product were subjected to tests for film strength on an extreme-pressure lubricant testing machine of the well-known Almen type as modified by Wieland. Seizing occurrent at 1,000 when the mixture of SAE 20 oil with the phosphine was employed as a lubricant between bearing and shaft. In the absence of the phosphine, the commercial product prevented seizing only up to 300.

EXAMPLE 10

A synthetic diester oil having a viscosity of 4.5 centistokes at 210° F. was mixed with nonadecylene-bis-tolyl-isobutyl-phosphine in a ratio of 95:5. The clear homogeneous liquid obtained was tested on the aforementioned Almen-Wieland testing apparatus in comparison with the unmixed diester oil. The admixture of the phosphine improved the seizing load from 900 to 1150.

Admixtures of bi-phosphine as low as one percent significantly improve the strength of conventional lubricant films under extreme pressure, and even lower concentrations produce measurable improvement. An increase in the phosphine concentration of a mixed lubricant beyond 5 percent does not normally result in better performance as long as the conventional component of the lubricant mixture prevails.

It is not fully understood why admixed bi-phosphines improve the pressure resistance of lubricant films interposed between bearing metal surfaces which move relative to each other under high pressure. It is believed that the biphosphines are selectively adsorbed on the bearing surfaces, and that a film of high strength and low friction coefficient is thereby formed. The high temperatures generated in a bearing under heavy load are believed to favor adsorption of the phosphine.

The phosphines are effective not only in lubricating bearings, as in the Almen machine test, but also for gear lubrication and, for the lubrication of pistons in internal combustion engines, and the like.

While the invention has been described with particular reference to specific embodiments, it is to be understood that it is not limited thereto, but is to be construed broadly and restricted solely by the scope of the appended claims.

What we claim is:

1. A method of lubricating metal surfaces arranged for movement relative to each other which comprises interposing between said surfaces a film of a lubricant composition including at least one percent of a liquid organic bi-phosphine of the formula

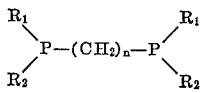

wherein $R_1$ and $R_2$ are members of the group consisting of alkyl, and aryl radicals, and wherein $n$ is an integer and at least six.

2. A method as set forth in claim 1, wherein said lubricant composition consists mainly of a major amount of petroleum hydrocarbons, and of a minor amount of said liquid organic bi-phosphine.

3. A method as set forth in claim 1, wherein said lubricant composition consists mainly of a major amount of a diester oil, and of said liquid organic bi-phosphine.

4. A lubricant composition mainly consisting of a major amount of petroleum hydrocarbons, and a minor amount of a liquid organic biphosphine of the formula

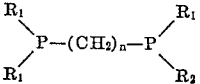

wherein $R_1$ and $R_2$ are members of the group consisting of alkyl, and aryl radicals, and wherein $n$ is an integer and at least six.

5. A lubricant composition mainly consisting of a major amount of a diester oil, and of a minor amount of a liquid organic biphosphine of the formula

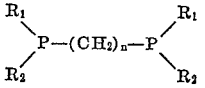

wherein $R_1$ and $R_2$ are members of the group consisting of alkyl, and aryl radicals, and wherein $n$ is an integer and at least six.

References Cited

UNITED STATES PATENTS

| 2,612,474 | 9/1952 | Morgan et al. | 252—49.8 |
| 3,086,056 | 4/1963 | Wagner | 260—606.5 |
| 3,118,951 | 1/1964 | Burg et al. | 260—606.5 |
| 3,160,593 | 12/1964 | Spooncer | 352—49.8 |

DANIEL E. WYMAN, *Primary Examiner.*

LEON D. ROSDOL, CARL D. QUARFORTH, REUBEN EPSTEIN, *Examiners.*

W. H. CANNON, L. A. SEBASTIAN,
*Assistant Examiners.*